Figure 1:
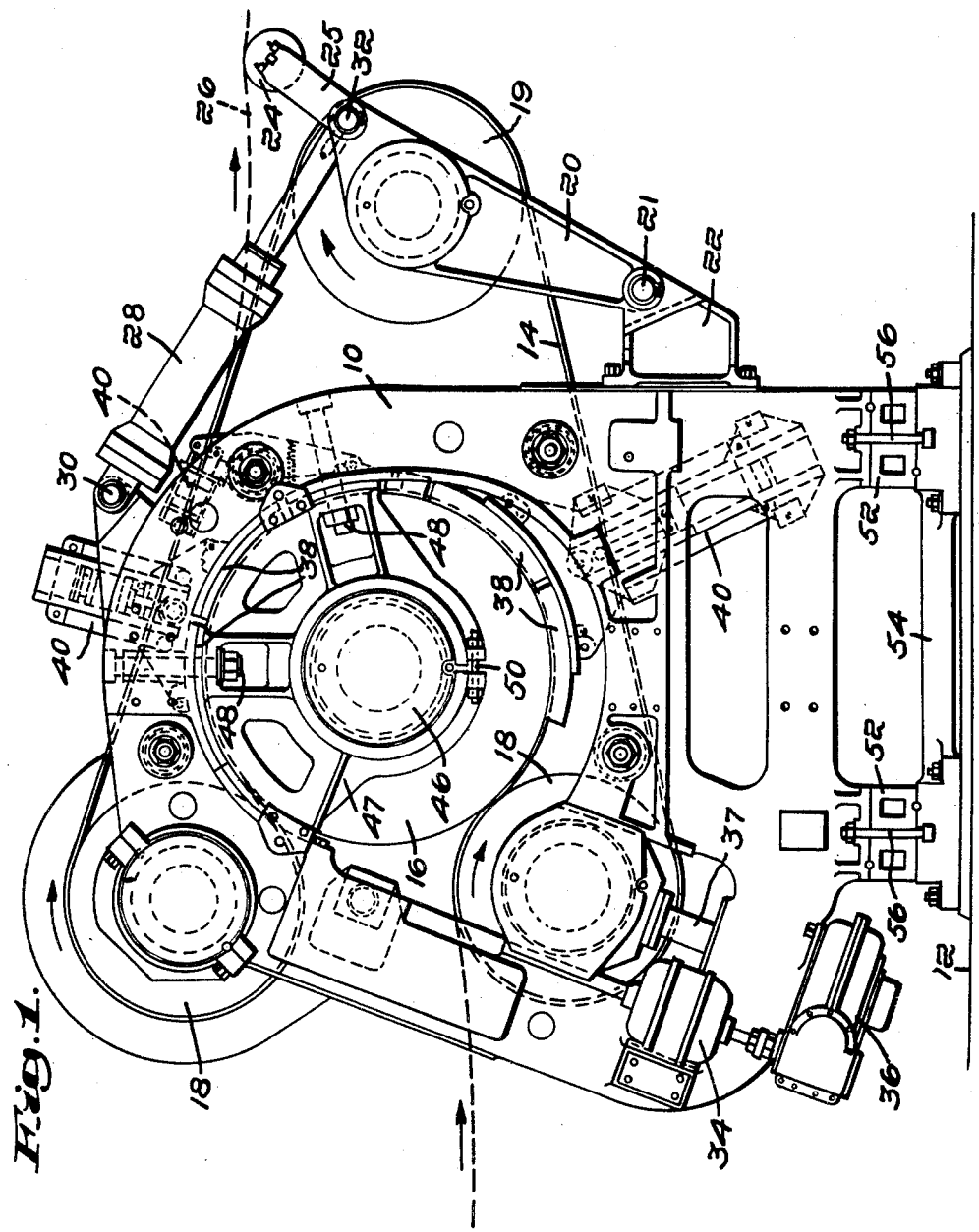

June 30, 1953  G. E. APEL ET AL  2,643,444
METHOD OF REMOVING VULCANIZING DRUM AND PRESSURE
BAND FROM CONTINUOUS VULCANIZING MACHINES
Original Filed Sept. 23, 1949  5 Sheets-Sheet 1

Inventors:
George E. Apel,
Don F. Collins,
by Kenway, Jenney, Witter & Hildreth
Attorneys Inventors:
George E. Apel,
Don F. Collins,
By Kenway, Jenney, Witter & Hildreth
Attorneys

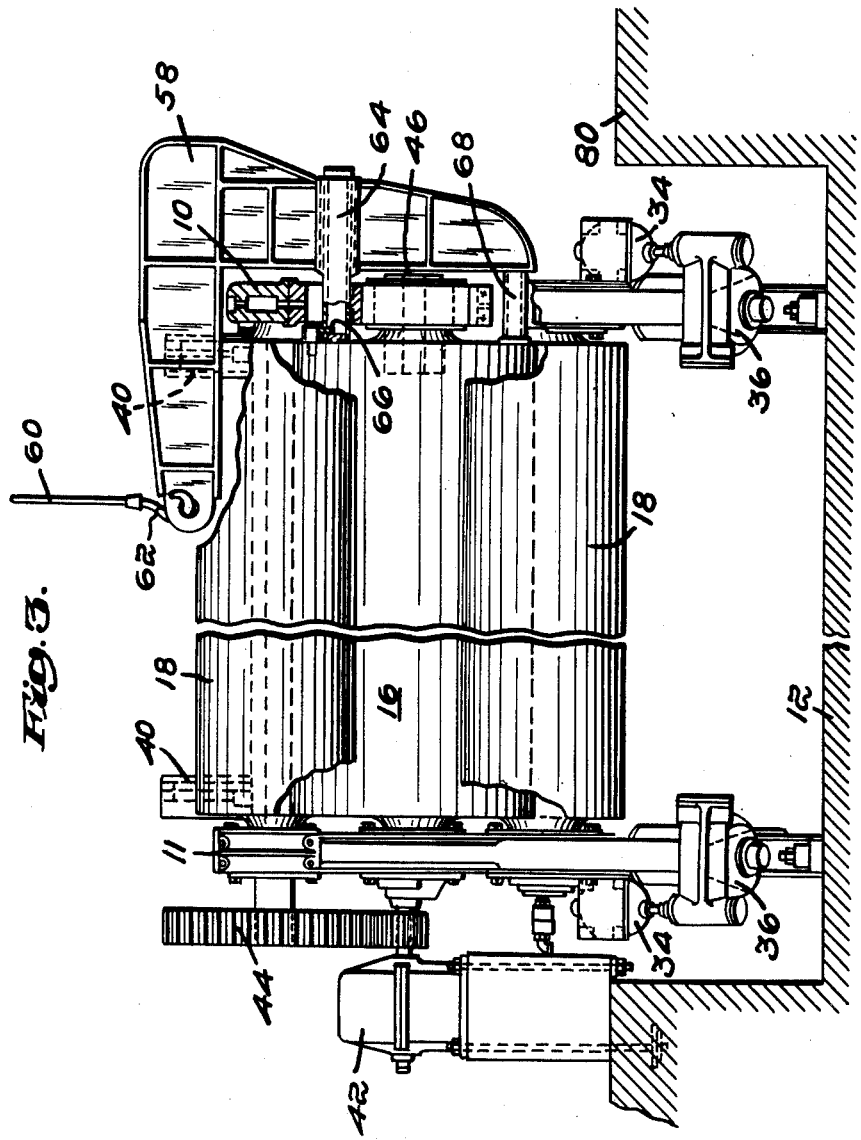

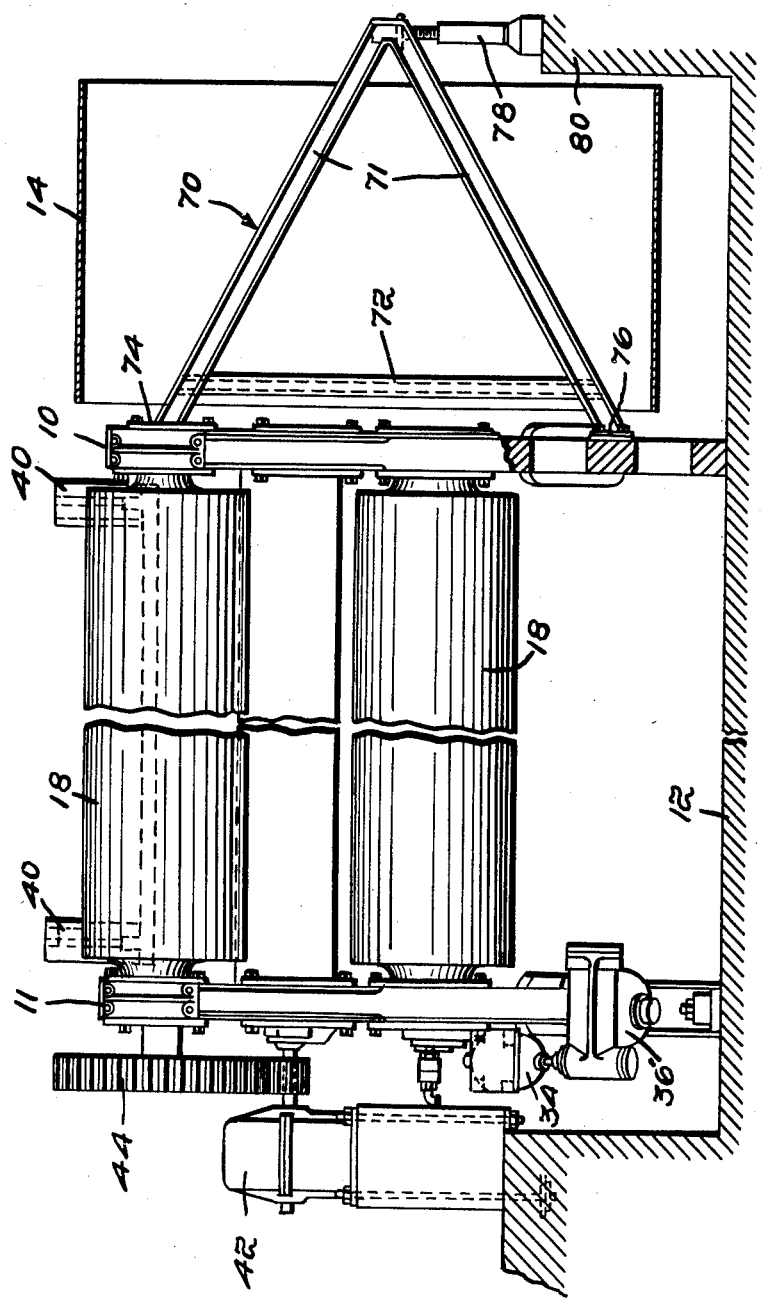

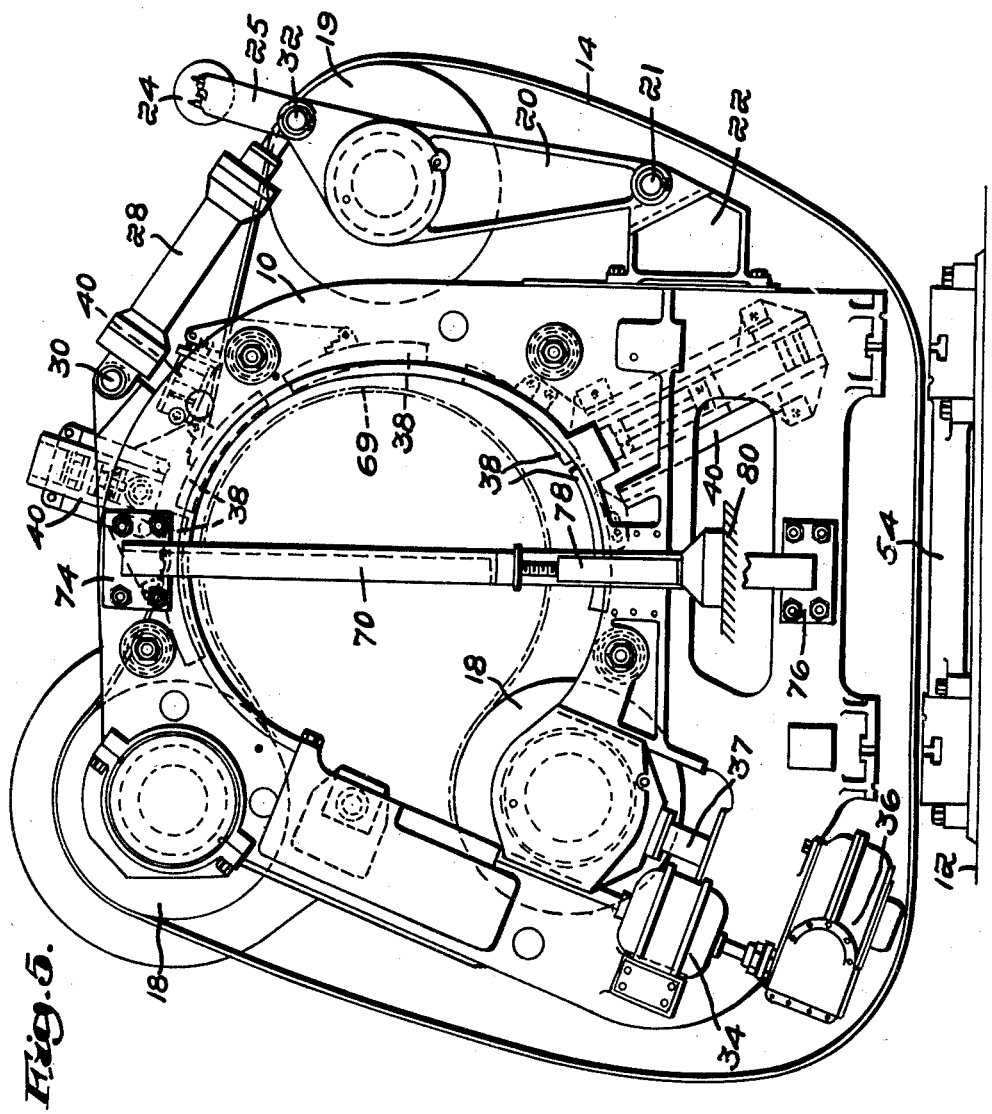

Patented June 30, 1953

2,643,444

UNITED STATES PATENT OFFICE 2,643,444

METHOD OF REMOVING VULCANIZING DRUM AND PRESSURE BAND FROM CONTINUOUS VULCANIZING MACHINES

George E. Apel, Belmont, Mass., and Don F. Collins, Pontiac, Mich., assignors to Boston Woven Hose and Rubber Company, Cambridge, Mass., a corporation of Massachusetts Original application September 23, 1949, Serial No. 117,432. Divided and this application June 13, 1950, Serial No. 167,864

2 Claims. (Cl. 29—148)

This application is a division of our copending application Serial No. 117,432, filed September 23, 1949, now Patent No. 2,591,995, and comprises a novel method of removing the vulcanizing drum and pressure band from continuous vulcanizing machines.

The machine is of heavy construction and embodies front and rear side frame rotatably supporting the vulcanizing drum at its ends and a plurality of rolls for supporting the endless band relative to the drum and including a tensioning roll for tightening the band into pressure contact with the drum. The band is relatively wide and constructed of sheet steel, and the drum and rolls are of substantial length and of considerable weight. Occasionally, it becomes necessary to remove or change the drum and/or band and heretofore this operation has required a complete disassembling of the entire machine. The primary object of the present invention resides in the production of an improved and novel method whereby the vulcanizing drum and/or pressure band can be removed or changed without disassembling the machine.

Briefly, the machine embodies novel power operated mechanism cooperating with the band tensioning roll for moving it to either band tensioning position or in the opposite direction to a position leaving the band slack relative to the drum and rolls, drum supporting mechanism permitting detachment of the drum from the frame, and removable frame supporting blocks permitting removing of the endless pressure band from the frame.

When the drum is to be removed it is supported from one end independently of the frame and removed endwise from the frame after being detached therefrom. If the pressure band is also to be removed, the weight of the frame over the removable blocks is supported independently of the base and the blocks removed, after which the band is removed from the frame through the space normally occupied by the removable blocks. These steps and the interchanging of another drum and band in the frame for those removed therefrom are hereinafter more specifically described. The production of a novel and improved method for effecting these changes comprises the primary object of the invention.

These and other features of the invention will be best understood and appreciated from the following description of a preferred embodiment thereof selected for purposes of illustration and shown in the accompanying drawings in which—

Figure 2:
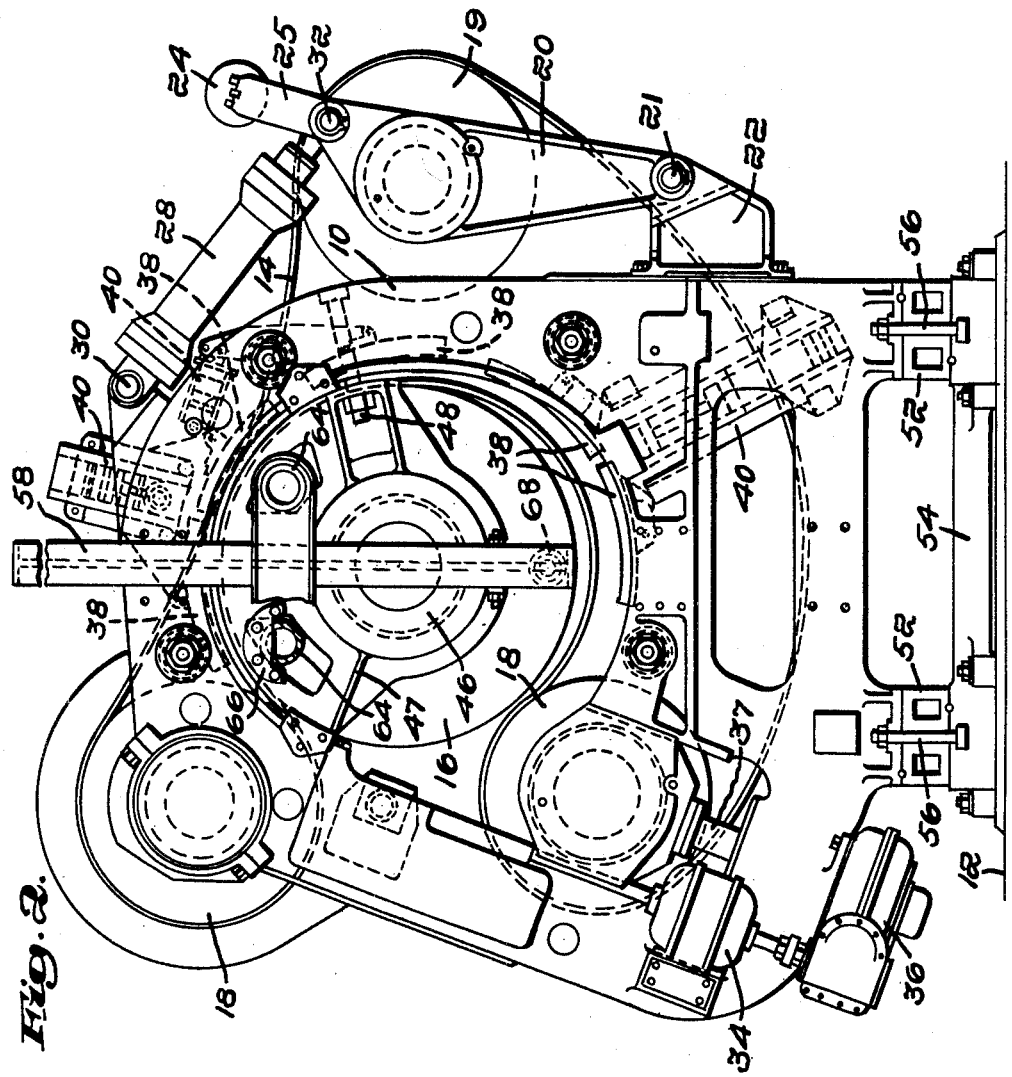

Fig. 1 is a front side elevation of a vulcanizing machine embodying the invention and illustrating the pressure band tensioned to working position, Fig. 2 is a like view showing the pressure band slack and cooperating mechanism for supporting the drum independently of the machine frame, Fig. 3 is a front end elevation of the machine shown in Fig. 2, Fig. 4 is a front elevation of the machine and cooperating mechanism for supporting the front end portion of the frame forwardly thereof and independently of the base on which it normally rests, and Fig. 5 is a front end elevation of the mechanism shown in Fig. 4.

The heavy metal frame of the machine comprises front and rear side frames 10 and 11 of similar shape rigidly connected and supported on a concrete base 12. The frame is designed to support three rolls over which passes a relatively wide steel pressure band 14 in a generally triangular path with a reentrant loop extending about a substantial arcuate portion of a large vulcanizing drum or cylinder 16 supported by the frame within the general outline of the path of the band. Two of the band supporting rolls 18 are located adjacent to and forwardly of the vulcanizing drum, and a third band tensioning roll 19 is located rearwardly of the drum, the pressure band being supported on these rolls and engaging the drum.

The band tensioning roll 19 is rotatably supported at its ends on a pair of arms 20 pivoted at 21 to brackets 22 bolted to the front and rear side frames 10 and 11. An idler roll 24 is carried on the outer ends of two auxiliary arms 25 for supporting the vulcanized strip 26 as it leaves the pressure band. Power operated means including two cylinders 28 pivotally attached to the side frames at 30 and having pistons therein attached to the two arms 20 at 32 is provided for moving the arms outwardly of the frame to tension the band and inwardly thereof to render the band slack. The power mechanism is fluid pressure operated either pneumatically or hydraulically.

The lower roll 18 additionally serves as a pressure roll to compress the strip 26 between the band and drum. Two motors 34 respectively at the ends of the roll operate through double reduction gearing and jack screws at 36 and 37 to move the roll toward and from the vulcanizing drum for this purpose. Steam heated shoes 38 are mounted for pressure contact with that portion of the band engaging the drum and power operated means including fluid pressure operated cylinders are provided at 40 for moving the shoes toward and from the band and drum. The machine is driven by a motor 42 through gearing 44 to the upper roll 18.

The front end of the vulcanizing drum is rotatably supported in a bearing 46 in a spider 47 detachably secured to the frame 10 by bolts 48. The front frame 10 has an opening therethrough in alignment with the drum sufficiently large to admit passage of the drum forwardly therethrough. The spider is split at its bottom portion and an adjusting bolt 50 is provided at the split for securing the bearing to the spider. A like spider and bearing construction is provided on the frame 11 for supporting the rear end of the drum. The frame 10 is supported on two removable blocks 52 resting on a base 54 on the concrete foundation 12, bolts 56 serving to secure these parts together.

The motor 42 drives the upper roll 18 and band 14 in the direction indicated by the arrow. The strip 26 to be vulcanized is fed into the bite between the band and drum at the lower roll 18 and is vulcanized as it passes about and in contact with the drum. The vulcanizing drum may have a pattern on its surface to be transferred to the strip and it is necessary to change drums when a different pattern is to be employed. The removal of the drum from the machine or the exchange of the drum in the machine for another drum is a considerable task since the drum weighs approximately 22,400 pounds and the other parts of the machine are correspondingly heavy, the entire machine weighing approximately 85,000 pounds. The removal and replacement of the endless steel pressure band 14 is also a considerable task which is facilitated and accomplished quite conveniently and more economically by the invention herein disclosed.

When the vulcanizing drum 16 is to be removed, the steam heated shoes 38 (usually five in number) are fully retracted to the position illustrated in Fig. 2. The band tensioning roll 19 is likewise retracted to a position leaving the band 14 slack as also shown in Fig. 2.

A drum engaging and supporting unit 58 carried by a cable 60 and a hook 62, suspended from an overhead monorail disposed over and longitudinally of the drum, is employed for supporting the drum. This unit is brought to the forward side of the machine and two tongues 64 carried by and projecting rearwardly of the unit are extended through two openings in the front spider 47 and engaged beneath and with two drum lifting lugs 66 attached to and extending outwardly from the forward end of the drum. A strut 68 carried by and extending inwardly from the bottom end of the unit is arranged to engage the end of the drum and take the counter-thrust load when the drum weight is taken by the cable.

When the cable has been raised sufficiently to take the weight of the drum from the frame 10, the bolts 48 are removed, thus freeing the spider 47 from the frame. The bolt 50 at the rear end of the drum is then loosened sufficiently to free the rear bearing 46 from its spider so that it can move forwardly with the drum. The unit 58, together with the drum, is then moved forwardly on the monorail, the front spider 47 with its bearing 46 and the rear bearing 46 remaining on the drum. The drum is thus moved forwardly on the monorail to any storage position desired.

Extra vulcanizing drums with the desired designs thereon are kept in storage with a bearing 46 on each rear end and a bearing 46 and spider 47 on each forward end, thus facilitating the placement of the drum in the machine. The drum to be replaced in the frame is brought to the machine on the monorail and installed by reversing the sequence of operations above described.

If and when the endless band 14 is to be removed or replaced, the vulcanizing drum is first removed as above described, the machine remaining otherwise intact. Removing of the drum releases the looped portion of the band, shown in broken lines at 69, so that it can be brought to the open position illustrated in full lines in Fig. 5.

An A-frame 70 embodying two V-legs 71 and a cross bar 72 is brought to the forward side of the machine and the base ends of the legs 71 are bolted to the frame 10 at 74 and 76, above and below the drum opening. A jack screw 78 on a support 80 is placed beneath the front V-end of the A-frame 70 and adjusted to a position taking the weight of the machine from the blocks 52. The bolts 56 and blocks 52 are then removed. The band 14 is then, by means of suitable overhead handling equipment, moved forwardly of and over the frame and through the openings previously occupied by the blocks 52, to a position (Fig. 4) between the jack screw and the frame 10.

The blocks 52 are then temporarily replaced, the jack screw and frame 70 removed, and the band transported to any position desired. The same or a substitute band is replaced on the machine by reversing the sequence of operations just described.

It will now be apparent that we have invented and herein disclosed a novel and economical method for removing and replacing the vulcanizing drum and the endless steel pressure band from and on continuous vulcanizing machines of the nature illustrated and described and that the invention is of considerable value and importance in the art when repair or interchanging of these parts are required.

Having thus declared our invention what we claim as new and desire to secure by Letters Patent is:

1. The method of removing the vulcanizing drum from a vulcanizing machine embodying a cylindrical vulcanizing drum rotatably supported horizontally at its ends in supports mounted on front and rear side frames and including a spider carrying the front end of the drum and detachably bolted to the front side frame at an opening therethrough of a size permitting longitudinal passage of the drum, an endless pressure band disposed to engage an arcuate portion of the drum and a plurality of rolls cooperating with the drum to support the band; which consists in supporting the drum from its front end independently of the frames by a counterbalancing lifting force disposed above and substantially midway of the length of the drum and maintaining the drum in horizontal position, releasing the front spider from its frame, and moving the drum axially forward through said opening from and relative to the frames and pressure band while thus supported.

2. The method of removing the endless pressure band from the vulcanizing machine defined in claim 1 in which the front side frame is supported on removable blocks, which consists in the steps defined in claim 1 plus the further steps of supporting the weight of the front side frame at a point disposed directly forward thereof a distance greater than the width of the pressure band, removing said removable blocks, moving the pressure band forwardly from and over the frame and through the space normally occupied by the removable blocks to a position between said point and the front side frame, thereafter replacing the removable blocks and transferring the weight of the front side frame thereto from said point, and thereafter completing the removal of the pressure band forwardly.

GEORGE E. APEL.
DON F. COLLINS.

References Cited in the file of this patent

UNITED STATES PATENTS

| Number | Name | Date |
|---|---|---|
| 307,352 | Tweddell | Oct. 28, 1884 |
| 923,852 | Kennedy | June 8, 1909 |
| 2,346,932 | Mays | Apr. 18, 1944 |
| 2,283,503 | Landis et al. | Aug. 28, 1945 |
| 2,405,544 | Anjesky | Aug. 13, 1946 |
| 2,409,463 | Ahrndt | Oct. 15, 1946 |
| 2,470,262 | Payser | May 17, 1949 |
| 2,479,023 | Peyrebrune | Aug. 16, 1949 |
| 2,513,959 | Onsrud | July 4, 1950 |